US009489846B2

(12) United States Patent
York et al.

(10) Patent No.: US 9,489,846 B2
(45) Date of Patent: Nov. 8, 2016

(54) MODIFYING DIRECTIONS TO A PARKING LOT ASSOCIATED WITH A VENUE BASED ON TRAFFIC CONDITIONS PROXIMATE TO THE PARKING LOT

(71) Applicant: VenueNext, Inc., Santa Clara, CA (US)

(72) Inventors: John E. York, Santa Clara, CA (US); John M. Paul, Palo Alto, CA (US); Edan Rosenberg, New York, NY (US); Brano Perkovich, Atherton, CA (US); Paraag Marathe, Los Altos, CA (US); Surjansu Kundu, Mountain View, CA (US)

(73) Assignee: VenueNext, Inc., Santa Clara, CA (US)

( * ) Notice: Subject to any disclaimer, the term of this patent is extended or adjusted under 35 U.S.C. 154(b) by 22 days.

(21) Appl. No.: 14/588,249

(22) Filed: Dec. 31, 2014

(65) Prior Publication Data

US 2016/0189545 A1    Jun. 30, 2016

(51) Int. Cl.
| | |
|---|---|
| *G08G 1/14* | (2006.01) |
| *G08G 1/065* | (2006.01) |
| *G01C 21/20* | (2006.01) |
| *G06Q 10/04* | (2012.01) |
| *H04W 4/22* | (2009.01) |

(52) U.S. Cl.
CPC .............. *G08G 1/14* (2013.01); *G01C 21/20* (2013.01); *G06Q 10/04* (2013.01); *G08G 1/065* (2013.01); *H04W 4/22* (2013.01)

(58) Field of Classification Search
CPC .... H04W 4/22; G10L 25/48; G01C 21/3691; G06Q 10/04
USPC ................... 701/117, 118; 455/456.3, 550.1
See application file for complete search history.

(56) References Cited

U.S. PATENT DOCUMENTS

| | | | | |
|---|---|---|---|---|
| 8,700,314 | B2* | 4/2014 | Vavrus | G01C 21/20 701/410 |
| 8,989,779 | B1* | 3/2015 | Centore, III | H04W 4/22 455/456.1 |
| 2008/0071465 | A1* | 3/2008 | Chapman | G01C 21/3691 701/117 |
| 2014/0058711 | A1* | 2/2014 | Scofield | G06Q 10/04 703/6 |
| 2014/0357312 | A1* | 12/2014 | Davis | G06F 3/0481 455/550.1 |
| 2015/0310739 | A1* | 10/2015 | Beaurepaire | G08G 1/0141 701/117 |

* cited by examiner

*Primary Examiner* — Thomas G Black
*Assistant Examiner* — Wae Louie
(74) *Attorney, Agent, or Firm* — Fenwick & West LLP

(57) ABSTRACT

A venue is associated with various parking lots, and a user may purchase a space in one of the parking lots. A venue management system associated with the venue stores an association between the user and the parking lot. Based on a location of a client device associated with the user, the venue management system communicates navigation directions to the client device for presentation to the user. The directions communicated to the client device account for traffic conditions within a threshold distance of the parking lot, and the venue management system may modify stored directions to the parking lot based on the traffic conditions and communicate the modified directions to the client device for presentation to the user. Additionally, the traffic conditions used by the venue management system include information describing on current usage of various parking lots associated with the venue to allow the user to bypass congestion.

16 Claims, 5 Drawing Sheets

MODIFYING DIRECTIONS TO A PARKING LOT ASSOCIATED WITH A VENUE BASED ON TRAFFIC CONDITIONS PROXIMATE TO THE PARKING LOT

BACKGROUND

This invention relates generally to facilitating user interaction with a venue, and more specifically to managing parking in parking lots associated with the venue.

Venues such as stadiums, convention centers, or amphitheaters frequently host events that large numbers of users attend. These users compensate the venue in exchange for attending the venue during an event, providing revenue to the venue. Many venues also obtain additional revenue from vendors associated with the venue that provide goods or services to users attending the venue or from selling parking spaces in one or more parking lots associated with the venue to users who are attending the venue.

However, if a large number of users attend a venue, congestion may impair many users' experience at the venue. For example, delays in placing orders with vendors or delays in vendors fulfilling received orders may discourage users from purchasing goods or services from vendors associated with the venue, decreasing revenue to the vendor. Similarly, delays or congestion when parking at a parking lot associated with a venue may frustrate a user, causing the user to seek alternative transportation to the venue, which may reduce revenue generated by the venue, or prevent the user from subsequently attending the venue.

SUMMARY

A venue is a geographic location, such as a geographic location associated with one or more structures. Examples of a venue include a stadium, a convention center, an arena, a theater, an amphitheater, or any other suitable structure or location where people may gather for an event. In various embodiments, users obtain a ticket to enter the venue, and various events are performed at the venue. Additionally, one or more vendors are associated with the venue and provide goods or services to users attending the venue. One or more parking lots, each including spaces for one or more vehicles, are also associated with the venue to allow users to more easily attend the venue.

To improve user interaction with the venue, a venue management system is associated with the venue and maintains information associated with users, with vendors associated with the venue, and with parking lots associated with the venue. The venue management system communicates information about the venue or about events occurring at the venue to client devices associated with users of the venue management system. Additionally, the venue management system receives orders for products or services from users and communicates the received orders to vendors associated with the venue to be fulfilled. Further, the venue management system receives information describing previously purchased spaces in various parking lots, currently occupied spaces in various parking lots, prices associated with various parking lots, and capacities associated with various parking lots. Hence, the venue management system allows a user to more easily obtain content associated with the venue, order products or services from vendors associated with the venue, and park in parking lots associated with the venue.

To simplify parking in parking lots associated with the venue, the venue management system maintains information identifying parking lots associated with the venue and describing various parking lots. Each parking lot is associated with a lot identifier that uniquely identifies a parking lot, with characteristics associated with characteristics of a parking lot stored in association with the parking lot's corresponding lot identifier. Characteristics of a parking lot include a capacity for the parking lot that specifies a maximum number of vehicles capable of being parked in the parking lot and a price associated with the parking lot for allocating a space in the parking lot to a vehicle. Additional characteristics of a parking lot include one or more locations associated with the parking lot (e.g., entrances) and directions to the one or more locations associated with the parking lot.

Certain characteristics of a parking lot are modified based on information is received by the venue management system from devices or systems associated with the parking lot. As users purchase spaces in a parking lot, the venue management system maintains a number of purchased spaces associated with the parking lot. Additionally, when a vehicle enters a parking lot, information is communicated from the parking lot to the venue management system, which maintains a number of vehicles currently occupying the parking lot. For example, a ticket is scanned or other information is captured by a device (e.g., scanner, card reader, terminal) when a vehicle enters the parking lot, and the device communicates an indication that information was captured to the venue management system, which increments a number of currently occupied spaces in the parking lot.

Based on a number of spaces currently associated with vehicles in various parking lots, the venue management system may communicate messages to client devices associated with venue management system users that identify one or more of the parking lots to encourage users to park in one or more of the identified parking lots. In one embodiment, the venue management system selects a parking lot based on a difference between a number of previously purchased spaces in the parking lot and a number of currently occupied spaces in the parking lot. For example, the venue management system selects a parking lot having at least a threshold difference between a number of previously purchased spaces and a number of currently occupied spaces, which indicates there are at least the threshold number of unoccupied spaces in the selected parking lot. To increase the number of vehicles in the selected parking lot, the venue management system communicates a message to client devices associated with one or more users identifying the selected parking lot. The message may indicate a number of unoccupied spaces in the selected parking lot as well as the price associated with the selected parking lot. To increase the likelihood of the user viewing the message, the venue management system may retrieve information associated with the user by the venue management system to select a type of communication channel (e.g., e-mail, text message, notification presented by an application associated with the venue management system and executing on client devices) for communicating the message to the user. In some embodiments, the venue management system modifies the price associated with the selected parking lot to encourage users to park vehicles in spaces of the selected parking lot. For example, the venue management system decreases a price of the selected parking lot to increase likelihoods of users purchasing spaces in the selected parking lot.

Additionally, the venue management system includes directions to one or more parking lots associated with the venue. For example, the venue management system includes one or more maps identifying locations of one or more parking lots along with indications of navigation directions to the locations of the one or more parking lots from positions relative to one or more of the locations (e.g., directions from the east of a location, directions from the north of a location). The venue management system may also maintain text directions describing navigation directions to locations of one or more parking lots. When a user purchases a space in a parking lot, the venue management system stores an association between the user and the parking lot in which a user purchased a space. For example, the user identifies a parking lot and communicates a request including payment information and a lot identifier of the parking lot to the venue management system, which stores an association between a user identifier of the user and the lot identifier of the parking lot. Subsequently, the venue management system receives a location of a client device associated with the user and communicates directions for navigating from the location of the client device to the parking lot corresponding to the lot identifier. For example, the venue management system communicates a map identifying a location of the parking lot and navigation information presented on the map to navigate to the location of the parking lot.

The venue management system also receives information describing traffic conditions within a threshold distance of the parking lot associated with the user and determines the directions for communication to the user based at least in part on the traffic conditions. Information describing the traffic conditions includes a number of currently occupied spaces in one or more additional parking lots, such as additional parking lots within a threshold distance of the parking lot associated with the user. Based on the information describing the traffic conditions, the venue management system may modify the directions to one or more locations associated with the parking lot associated with the user. For example, the venue management system modifies the directions to a location associated with the parking lot to avoid one or more additional parking lots with at least a threshold number of currently occupied spaces or to avoid one or more geographic regions having at least a threshold number or density of vehicles. As traffic conditions change, the venue management system may further modify the direction to a location associated with the parking lot and communicate the further modified directions to the client device associated with the user, allowing a user to bypass congestion when travelling to the parking lot associated with the user.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

Venue Overview

Figure 1:
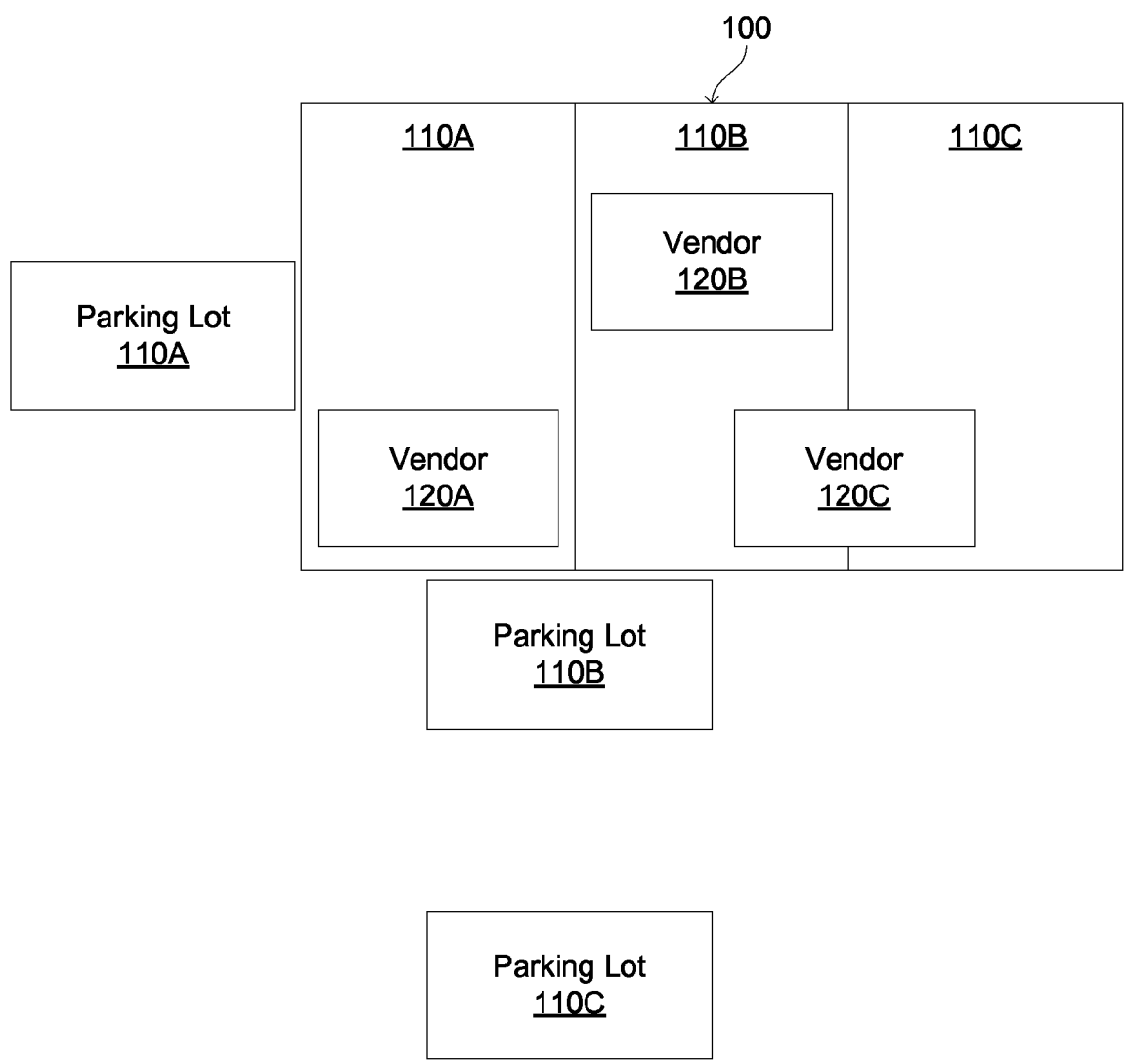
FIG. 1 is a block diagram of a venue, in accordance with an embodiment of the invention.

FIG. 1 is a block diagram of one embodiment of a venue 100. In the example of FIG. 1, the venue includes multiple regions 110A, 110B, 110C (also referred to individually and collectively using reference number 110). Additionally, one or more vendors 120A, 120B, 120C (also referred to individually and collectively using reference number 120) are included in the venue 100, and one or more parking lots 130A, 130B, 130C (also referred to individually and collectively using reference number 130) are associated with the venue 100. However, in other embodiments, different and/or additional components may be associated with or included in the venue 100.

The venue 100 is a geographic location, such as a geographic location associated with one or more structures. Examples of a venue 100 include a stadium, a convention center, an arena, a theater, an amphitheater, or other suitable structure. In various embodiments, users obtain a ticket to enter the venue 100, and various events are performed at the venue. For example, a user obtains a ticket to attend an event at the venue 100 that authorizes the user to enter the venue 100 for the event. One or more regions 110 are included in the venue 100, with each region 110 corresponding to an area including a set of locations within the venue 100. For example, different regions 110 correspond to different sections of a stadium, different aisles of a stadium or arena, different rooms in a convention center, or any other suitable area within the venue 100. In some embodiments, an area within the venue 100 is associated with multiple regions 110 having different levels of precision. For example, a specific seat in a venue 100 is associated with a region 110 identifying a section including the seat, another region 110 identifying an aisle within the section including the seat, and an additional region identifying the specific seat. While FIG. 1 shows an example venue 100 including three regions 110A, 110B, 110C, in other embodiments, a venue 110 may include any number of regions 110.

One or more vendors 120 are included in the venue 110, with each vendor providing products or services to users within the venue 110. Examples of vendors 120 include restaurants, food service providers, beverage providers, merchandise retailers, or other suitable entities providing products or services. Different vendors 120 may be associated with different regions 110 of the venue. For example, a vendor 120A is associated with a region 110A, while a different vendor 120B is associated with a different region 110B. A vendor 110 may be associated with multiple regions 110; for example, a vendor 110C is associated with a region 110B as well as with an additional region 110C. In some embodiments, a vendor 120 is associated with a region 110 based on a distance between the vendor 120 and the region 110. For example, the vendor 120 is associated with a region 110 having a minimum distance from a location associated with the vendor 120. If a location associated with a vendor 120 is within a region 110, the vendor 120 is associated with the region 110 including the vendor's associated location.

Additionally, one or more parking lots 130A, 130B, 130C are associated with the venue 110 and identify physical locations for parking vehicles. Each parking lot includes one or more spaces, each space for parking a vehicle. A price is associated with each parking lot 130 specifying an amount of compensation a user provides to an entity associated with the venue 110 for a space in the parking lot 130 to be allocated for parking a vehicle associated with the user. Different parking lots 130 may have different distances from the venue 110, and prices associated with different parking lots 130 may be inversely proportional to a distance between a parking lot 130 and the venue 110. Each parking lot 130 is also associated with a capacity specifying a maximum number of vehicles that may be parked in a parking lot 130. The capacity may be total number of spaces in the parking lot 130 or may be a maximum number of vehicles. Information may be maintained by one or more devices included in a parking lot 130 specifying a number of spaces in the parking lot 130 in which vehicles are parked, specifying a number of vehicles within a geographic area associated with the parking lot 130, or any other suitable information. For example, a device included in the parking lot 130 increments a counter when a vehicle enters the geographic area associated with the parking lot 130 or when a vehicle is parked in a space of the parking lot 130.

System Architecture

Figure 2:
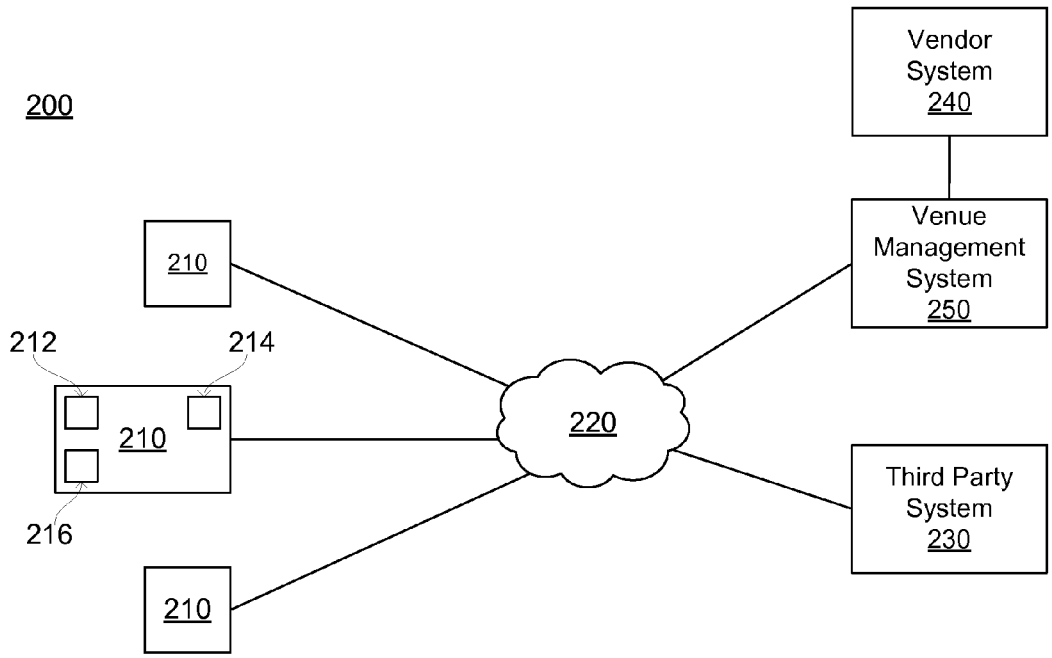
FIG. 2 is a block diagram of a system environment including a venue management system, in accordance with an embodiment of the invention.

FIG. 2 is a block diagram of a system environment 200 for a venue management system 250. The system environment 200 shown by FIG. 1 includes various client devices 210, a network 220, a third party system 230, one or more vendor systems 240, and a venue management system 250. In alternative configurations, different and/or additional components may be included in the system environment 200. The embodiments described herein may be adapted to online systems other than venue management systems.

A client device 210 is one or more computing devices capable of receiving user input as well as transmitting and/or receiving data via the network 220. In one embodiment, the client device 210 is a conventional computer system, such as a desktop computer or a laptop computer. Alternatively, the client device 210 may be a device having computer functionality, such as a personal digital assistant (PDA), a mobile telephone, a smartphone or another suitable device. A client device 210 is configured to communicate with other devices via the network 220. In one embodiment, the client device 210 executes an application allowing a user of the client device 210 to interact with the venue management system 250. For example, the client device 210 executes a browser application to enable interaction with the venue management system 250 or with one or more third party system 230 via the network 220. In another embodiment, a client device 210 interacts with the venue management system 250 through an application programming interface (API) running on a native operating system of the client device 210, such as IOS® or ANDROID™.

A display device 212 included in a client device 210 presents content items to a user of the client device 210. Examples of the display device 212 include a liquid crystal display (LCD), an organic light emitting diode (OLED) display, an active matrix liquid crystal display (AMLCD), or any other suitable device. Different client devices 210 may have display devices 212 with different characteristics. For example, different client devices 212 have display devices 212 with different display areas, different resolutions, or differences in other characteristics.

One or more input devices 214 included in a client device 210 receive input from the user. Different input devices 214 may be included in the client device 210. For example, the client device 210 includes a touch-sensitive display for receiving input data, commands, or information from a user. Using a touch-sensitive display allows the client device 210 to combine the display device 212 and an input device 214, simplifying user interaction with presented content items. In other embodiments, the client device 210 may include a keyboard, a trackpad, a mouse, or any other device capable of receiving input from a user. Additionally, the client device may include multiple input devices 214 in some embodiments. Inputs received via the input device 214 may be processed by an application associated with the venue management system 250 and executing on the client device 210 to allow a client device user to exchange information with the venue management system 250.

Additionally, a client device 210 may include one or more position sensors 216, which determine a physical location associated with the client device 210. For example, a position sensor 216 is a global positioning system (GPS) sensor that determines a location associated with the client device 210 based on information obtained from GPS satellites communicating with the GPS sensor, such as coordinates specifying a latitude and longitude of the location associated with the client device 210. As another example, a position sensor 216 determines a location associated with the client device 210 based on intensities of signals received from one or more access points (e.g., wireless access points) by the client device 110. In the preceding example, the position sensor 216 determines a location associated with the client device 210 based on signal intensity between the client device 210 and one or more wireless access points and service set identifiers (SSIDs) or media access control (MAC) addresses of the wireless access points. However, the client device 210 may include any suitable type of position sensor 216. In various embodiments, the client device 210 may include multiple position sensors 216.

The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 130 may be coupled to the network 220 for communicating with one or more client devices 110 or with the venue management system 250. In one embodiment, a third party system 230 is an application provider communicating information describing applications for execution by a client device 210 or communicating data to client devices 110 for use by an application executing on the client device 210. In other embodiments, a third party system 230 provides content or other information for presentation via a client device 210. For example, a third party system 230 provides content related to an event occurring at the venue 110 to a client device 210 for presentation to a user; as an example, the third party system 230 provides video or audio data of a portion of an event occurring at the venue to a client device 210, allowing a user associated with the client device 210 to view the portion of the event from an alternative vantage point than the user's vantage point or to hear commentary about the portion of the event. As another example, a third party system 230 is a social networking system maintaining connections between various users and providing content for presentation to users based at least in part on the maintained connections. A third party system 230 may also communicate information to the venue management system 250, which subsequently communicates the information, or a portion of the information, to one or more client devices 110 via the network 220.

Additionally, one or more vendor systems 240 are coupled to the venue management system 250 via the network 220 or through direct connections between the vendor systems 240 and the vendor management system 150. A vendor system 240 is associated with a vendor 120 and receives orders for products or services from the venue management system 250 and provides the products or services identified by the orders. Further, a vendor system 240 provides the venue management system 250 with information describing fulfilment of orders by a vendor 120 associated with the vendor system 240. For example, the vendor system 240 provides information to the venue management system 250 specifying an estimated time to fulfill subsequently received or pending orders for products or services, an average time in which previously received orders were fulfilled, a number of unfulfilled orders received by the vendor system 240, or other suitable information. Information provided from the vendor system 240 to the vendor management system 150 accounts for orders received via the vendor management system 150 as well as orders received by the vendor 120 associated with the vendor system 240 from users visiting a location associated with the vendor 120.

Additionally, a vendor system 240 may provide information to the venue management system 250 describing products or services sold by a vendor 120 associated with the vendor system 240. For example, the vendor system 240 identifies a number of different products or services 140 sold by the vendor 120 or identifies an amount of revenue received by the vendor 120 in exchange for different products or services. Information describing sold products or services may be communicated from the vendor system 240 to the venue management system 250 as the products or services are sold or may be communicated from the vendor system to the venue management system 250 at periodic intervals. Additionally, the venue management system 250 may request information describing sales of products or services to a vendor system 240, which provides the requested information to the venue management system 250 in response to receiving the request.

The venue management system 250, which is further described below in conjunction with FIG. 3, receives content from one or more third party systems 230 or generates content and provides content to users via an application associated with the venue management system 250 and executing on client devices 210. Additionally, the venue management system 250 maintains information associated with one or more parking lots 130 associated with a venue 100, such as a number of spaces in a parking lot 130 currently occupied, a price associated with a the parking lot 130, or a number of spaces in the parking lot 130 that have been purchased, as well as directions for navigating to a location associated with the parking lot 130. The venue management system 250 may communicate certain information associated with a parking lot 130 to one or more users, such as the price associated with the parking lot 130 or directions to the location associated with the parking lot 130. Associations between one or more vendors 120 and regions 110 of the venue 100 are also included in the venue management system 250, which also receives orders for products or services from one or more users and communicates the orders to one or more vendors 120 for fulfillment.

Figure 3:
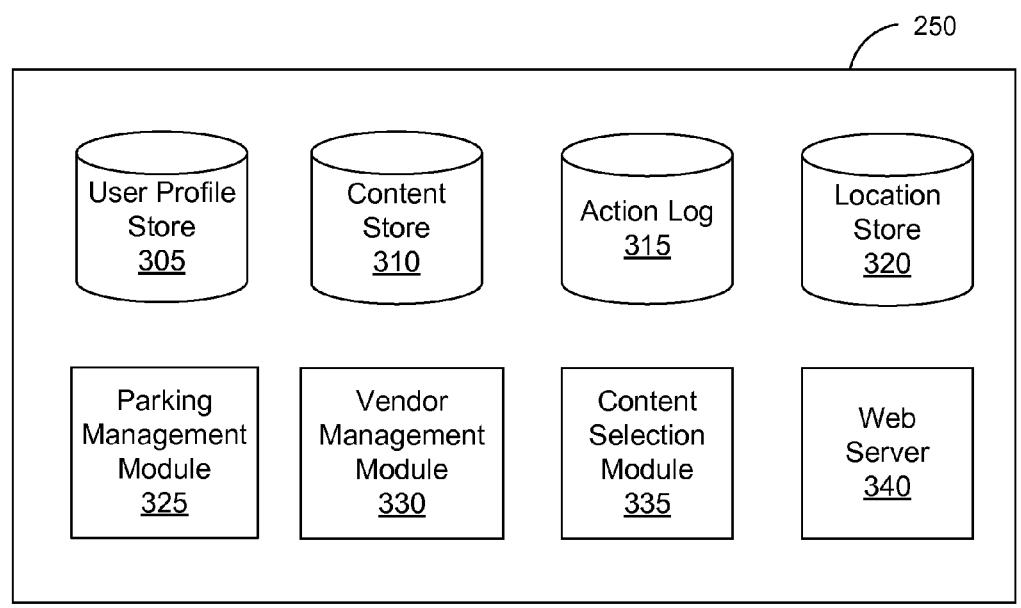
FIG. 3 is a block diagram of a venue management system, in accordance with an embodiment of the invention.

FIG. 3 is a block diagram of an architecture of a venue management system 250. The venue management system 250 shown in FIG. 3 includes a user profile store 305, a content store 310, an action log 315, a location store 320, a parking management module 325, a vendor management module 330, a content selection module 335, and a web server 340. In other embodiments, the venue management system 250 may include additional, fewer, or different components for various applications. Conventional components such as network interfaces, security functions, load balancers, failover servers, management and network operations consoles, and the like are not shown so as to not obscure the details of the system architecture.

Each user of the venue management system 250 is associated with a user profile, which is stored in the user profile store 305. A user profile includes declarative information about the user provided by the user and may also include information inferred by the venue management system 250 from actions associated with the user or from other information. In one embodiment, a user profile includes multiple data fields, each describing one or more attributes of the corresponding user. Examples of information stored in a user profile include demographic information, contact information, preferences, and location information. For example, a user profile identifies a region 110 of the venue 100 associated with a user, such as a region 110 including a seat associated with a ticket to attend the venue 100 associated with the user. A user profile may also store other information provided by the user, for example, image data or video data. Additionally, a user profile in the user profile store 205 may also maintain references to actions by the corresponding user performed on content presented by the venue management system 250 or interactions between the corresponding user captured by one or more vendor systems 240 and communicated to the venue management system 250. For example, a user profile identifies prior orders for products or services the venue management system 250 received from a user and communicated to one or more vendor systems 150.

In some embodiments, a user profile includes a status associated with the user. The venue management system 250 may provide different functionality to a user based on the user's status. For example, the venue management system 250 communicates certain types of messages to client devices 210 associated with users having a specific type of status and does not communicate the certain types of messages to client devices 210 associated with users that do not have the specific type of status. As another example, the venue management system 250 presents less advertisement content to users having specific statuses. The status may be based on a frequency with which the user is associated with tickets to attend the venue 100 or an amount of money the venue management system 250 has received from the user (e.g., based on an amount the user has spent on tickets to attend the venue 100). Additionally, a user may provide an amount of compensation to the venue management system 250 for a specific status to be associated with the user. For example, the user provides the venue management system 250 with an amount of compensation per year or per month for the venue management system 250 to associate a specific status with the user.

The content store 310 stores objects that each represent various types of content received from one or more third party systems 230 or generated by the venue management system 250. Examples of content represented by an object include video data associated with an event occurring at the venue 100, image data associated with an event occurring at the venue 100, audio data associated with an event occurring at the venue 100, text data associated with an event occurring at the venue 100, information associated with the venue 100 or with the location of the venue 100, or other suitable. Additionally, content may be received from applications associated with a third party system 230 and executing on client devices 210 associated with users of the venue management system 230. In one embodiment, objects in the content store 210 represent single pieces of content, or content "items."

The action log 315 stores information describing actions performed by venue management system users internal to or external to the venue management system 250. For example, actions performed by a user on a third party system 230 that communicates information to the venue management system 250 are stored in the action log 315 along with information describing actions performed by the user through the venue management system 250. Examples of actions include: ordering a product or service from a vendor 120 included in the venue 100, checking-into the venue, accessing content provided by the venue management system 250 or provided by a third party system 230 that communicates with the venue management system 250, providing a review of a product, service, or vendor 120 to the venue management system 250 or to a third party system 230 that communicates with the vendor management system 250, providing a comment associated with the venue 100 or with an event occurring at the venue 100 to the venue management system 250 or to a third party system 230 that communicates with the venue management system 250. However, any suitable action may be stored in the action log 315 and associated with a user profile in the user profile store 305. Information in the action log 315 may identify the user performing an action, a type of the action, a description of the action, a time associated with the action, or any other suitable information. In some embodiments, data from the action log 315 is used to infer interests or preferences of a user, augmenting interests included in the user's user profile and allowing a more complete understanding of user preferences.

The action log 315 may also store user actions taken on a third party system 230, such as an external website, and communicated to the venue management system 250. For example, an e-commerce website may recognize a user of the venue management system 250 through a plug-in enabling the e-commerce website to identify the venue management system user. Because users of the venue management system 250 are uniquely identifiable, third party systems 230 may communicate information about a user's actions outside of the venue management system 250 to the venue management system 250 for association with the user. Hence, the action log 315 may record information about actions users perform on a third party system 230, such as purchases made, comments on content, or other information a user authorizes a third party system 230 to communicate to the vendor management system 250.

The location store 320 includes physical locations associated with various regions 110 of the venue 100. In various embodiments, the location store 320 includes a region identifier associated with each region 110 and information identifying a geographic area associated with the region identifier. Any suitable information may identify the geographic area associated with a region identifier. Example information identifying a geographic area of a region 110 include: physical coordinates specifying boundaries of a region 110 and an identifier of a portion of the venue 100 including the region 110. Additionally, the location store 320 includes data associating vendors 120 with one or more regions 110 of the venue 100. A vendor identifier uniquely associated with a vendor 120 is associated with a region identifier, with the association stored in the location store 320. Multiple vendors 120 may be associated with a region 110 of the venue 100.

In some embodiments, the location store 320 also associates location information with users of the venue management system 250. A client device 210 communicates location information to the venue management system 250, which may store the location information in the location store 320 or in the user profile store 305 in association with the user. Based on the received information, the venue management system 250 may determine a region 110 of the venue including the location information and associate the region identifier of the determined region with a user profile corresponding to the user. If the venue management system 250 receives modified location information from the client device 210, the venue management system 205 may modify the determined region 110 if a different region includes the modified location information. Alternatively, one or more sensors included in the venue 100 identify a client device 210 and determine a location associated with the client device 210. Based on the determined location, the venue management system 250 identifies a region 110 including the client device 110 and stores a region identifier of the region 110 in association with a user identifier of a user associated with the client device 210. In various embodiments, information identifying a location associated with the client device 210 (e.g., latitude and longitude) is also stored in the location store 320 in association with an identifier associated with the user associated with the client device 210. Additionally, the venue management system 250 may assign a location to a user and store the assigned location in association with the user in the location store 320. For example, when a user purchases a ticket to enter the venue 100, the ticket is associated with a location assigned to the user, and the location store 320 includes information associating the location assigned to the user from the ticket with an identifier associated with the user.

The parking management module 325 includes information identifying parking lots 130 associated with the venue and describing various parking lots 130. Each parking lot 130 is associated with a lot identifier that uniquely identifies a parking lot 130. Characteristics of a parking lot 130 are stored in the parking management module 325 in association with a lot identifier corresponding to the parking lot 130. Characteristics of a parking lot 130 include a capacity for the parking lot 130 that specifies a maximum number of vehicles capable of being parked in the parking lot 130 and a price associated with the parking lot 130 for allocating a space in the parking lot 130 to a vehicle. Additional characteristics of a parking lot 130 include one or more locations associated with the parking lot 130 (e.g., entrances) and directions to the location associated with the parking lot 130. Directions from one or more locations associated with the parking lot 130 to the venue 100 may also be maintained by the parking management module 325.

Certain characteristics of a parking lot 130 are modified based on information is received by the venue management system 250. As users purchase spaces in a parking lot 130, the parking management module 325 maintains a number of purchased spaces associated with the parking lot 130. Additionally, when a vehicle enters a parking lot 130, information is communicated from the parking lot to the venue management system 250, where the parking management module 325 maintains a number of vehicles currently occupying the parking lot 130 or a number of currently occupied spaces in the parking lot 130. In some embodiments, a ticket is scanned or other information is captured by a device (e.g., scanner, card reader, terminal) when a vehicle enters the parking lot 130; the device communicates an indication that information was captured to the venue management system 250, causing the parking management module 325 to increment a number of spaces in the parking lot 130 currently associated with vehicles or to increment a number of currently occupied spaces in the parking lot 130. Thus, the parking management module 325 maintains a number of spaces in a parking lot 130 that are currently occupied by vehicles and modifies the number of currently occupied spaces as vehicles are parked in the parking lot.

Based on a number of spaces currently associated with vehicles in various parking lots 130, the parking management module 325 may communicate messages to client devices 210 identifying one or more of the parking lots 130. In one embodiment, the parking management module 325 selects a parking lot 130 based on a difference between a number of previously purchased spaces in the parking lot 130 and a number of currently occupied spaces in the parking lot 130. For example, the parking management module 325 selects a parking lot 130 having at least a threshold difference between a number of previously purchased spaces and a number of currently occupied spaces, which indicates there are at least the threshold number of unoccupied spaces in the selected parking lot 130. To increase the number of vehicles in the selected parking lot 130, the parking management module 325, the parking management module communicates a message to client devices 110 associated with one or more users identifying the selected parking lot. The message may indicate a number of unoccupied spaces in the selected parking lot 130 as well as the price associated with the selected parking lot 130. In some embodiments, the parking management module 325 modifies the price associated with the selected parking lot 130 to encourage users to park vehicles in spaces of the selected parking lot 130. For example, the parking management module 325 decreases a price of the selected parking lot 130 to increase likelihoods of users purchasing spaces in the selected parking lot 130. Communicating messages identifying a parking lot 130 to users is further described below in conjunction with FIG. 4.

Additionally, the parking management module 325 includes directions to one or more parking lots 130 associated with the venue 100. For example, the parking management module 325 includes one or more maps identifying locations associated with one or more parking lots 130 along with indications of navigation directions to the locations associated with the one or more parking lots 130. The parking management module 325 may also maintain text directions describing navigation to locations associated with one or more parking lots 130. When a user purchases a space in a parking lot 130, the parking management system 325 stores an association between a user and the parking lot 130 in which the user purchased the space. For example, the user identifies a parking lot 130 and communicates a request including payment information and a lot identifier of the parking lot 130 to the venue management system 250, where the parking management module 325 stores an association between a user identifier of the user and a lot identifier of the parking lot 130. Subsequently, the parking management module 325 receives a location of a client device 210 associated with the user and communicates directions for navigating from the location of the client device 210 to the parking lot 130 corresponding to the lot identifier. For example, the parking management module 325 communicates a map identifying a location of the parking lot 130 and navigation information presented on the map to navigate to the location associated with the parking lot 130 to a client device 210 associated with the user.

The parking management module 325 also receives information describing traffic conditions within a threshold distance of the parking lot 130 associated with the user and determines the directions for communication to the user based at least in part on the traffic conditions. Information describing the traffic conditions includes a number of currently occupied spaces in one or more additional parking lots 130, such as additional parking lots 130 within a threshold distance of the parking lot 130 associated with the user. Based on the information describing the traffic conditions, the parking management module 325 may modify the directions to one or more locations associated with the parking lot associated with the user. For example, the parking management module 325 modifies the directions to a location associated with the parking lot 130 to avoid one or more additional parking lots 130 with at least a threshold number of currently occupied spaces or to avoid one or more geographic regions having at least a threshold number or density of vehicles. As traffic conditions change, the parking management module 325 may further modify the direction to a location associated with the parking lot 130 and communicate the further modified directions to the client device 210 associated with the user, allowing a user to bypass congestion when travelling to the parking lot 130 associated with the user. Communication of directions to a location of a parking lot 130 is further described below in conjunction with FIG. 5.

The vendor management module 330 receives orders for products or services from client devices 210 associated with users and communicates the orders to one or more vendor systems 240 of vendors 120 associated with the venue 100. In various embodiments, the vendor management module 330 includes vendor profiles each associated with one or more vendors 120 associated with the venue 100. A vendor profile includes a vendor identifier uniquely identifying a vendor 120 and additional information associated with the vendor 120, such as one or more regions 110 of the venue 100 associated with the vendor 120 and information for communicating with a vendor system 240 associated with the vendor 120. Further examples of information associated with the vendor 120 and included in a vendor profile include: contact information, hours of operation, a listing of products or services provided by the vendor 120, a current inventory or products maintained by the vendor 120, and a current time for the vendor 120 to fulfill received orders. However, in other embodiments, additional or different information may be included in the vendor profile. One or more users authorized by the venue management system 250 may communicate information to the vendor management system 330 to modify regions 110 of the venue associated with one or more vendors 120.

When the vendor management module 330 receives an order identifying a product or service and identifying a vendor 120 from a user, the vendor management system 330 communicates the order to a vendor system 240 corresponding to the identified vendor 120. The vendor 120 may subsequently deliver the product or service identified by the order to the user or may communicate a notification to the user via the venue management system 250 when the order is fulfilled. To expedite delivery of products or services, the vendor management module 330 may associate different vendors 120 with different regions 110 or the venue 100 to reduce time for users to receive products or services delivered by vendors 120. The vendor management module 330 may modify regions 110 of the venue 100 associated with a vendor 120 by modifying identifiers of regions 110 included in a vendor profile of a vendor 120. In some embodiments, the vendor management module 330 modifies regions 110 associated with a vendor 120 based on a number or a frequency of orders received from users associated with different regions 110 as well as time to fulfill orders by different vendors 120, products or services offered by different vendors 120, and number of orders received by different vendors 120. When modifying regions 110 associated with a vendor 120 or vendors 120 associated with a region, the venue management system 330 may account for products or services provided by various vendors 120 so similar products or services are provided to users in a region 110 before and after modification of the vendors 120 associated with the region 110.

Additionally, the vendor management module 330 receives information from a vendor system 240 and communicates the information to one or more client devices 210 for presentation to users. For example, the vendor 240 communicates a time to fulfill an order, an estimated time to fulfill an order, a number of previously received orders that have yet to be fulfilled, or other suitable information to the vendor management module 330, which provides at least a subset of the information to a client device 210 for presentation to a user. As another example, a vendor system 250 communicates a message to the venue management module 330 including a user identifier, an order identifier (or a description of an order), and an indication that an order corresponding to the order identifier has been fulfilled by a vendor. The vendor management module 330 identifies a user corresponding to the user identifier from the user profile store 305 and communicates the message to a client device 210 associated with the user.

As vendors 120 may deliver products to users in various regions 110 of the venue 100 to fulfill orders received from various users, in some embodiments, the vendor management module 330 regulates communication of orders received from client devices 210 associated with users to vendor systems 240 associated with various vendors 120. When the vendor management module 330 receives an order for a product or service from a client device 210 associated with a user, the vendor management module 330 stores the received order in a queue for a specified time interval before communicating the order to a vendor system 240 corresponding to a vendor 120 identified by the order. If the vendor management system 330 receives additional orders from users having one or more characteristics matching or similar to the order stored in the queue and identifying the vendor 120 identified by the order while the order is stored in the queue, the vendor management module 330 generates a group including the additional orders and the order stored in the queue and communicates the group or orders to a vendor system 240 associated with the vendor 120 to be fulfilled. For example, the vendor management system 330 generates a group including additional orders associated with users having a location matching a location of a user associated with an order stored in the queue. As additional examples, the vendor management system 330 generates a group including orders identifying products or services matching or similar to a product or service specified by an order stored in the queue or generates a group including orders identifying products or services having times for fulfillment within a threshold value of a time for fulfillment of the order stored in the queue. Communicating a group of orders having one or more matching or similar characteristics to a vendor system 240 allows the vendor 120 associated with vendor system 240 to more efficiently fulfill orders from users.

The content selection module 335 selects one or more content items for communication to a client device 210 for presentation to a user. Content items eligible for presentation to the user are retrieved from the content store 310, from a third party system 230, or from another source, by the content selection module 335, which selects one or more of the content items for presentation to the user. A content item eligible for presentation to the viewing user is a content item associated with at least a threshold number of targeting criteria satisfied by characteristics of the user or is a content item that is not associated with targeting criteria. For example, a content item associated with targeting criteria specifying a threshold distance of the venue 100 is identified as eligible for presentation to users associated with locations within a threshold distance of the venue 100. As another example, a content item associated with targeting criteria specifying attendance of an event at the venue 100 is identified as eligible for presentation to users attending the event or who have indicated they will attend the event. In various embodiments, the content selection module 335 includes content items eligible for presentation to the user in one or more selection processes, which identify a set of content items for presentation to the user. For example, the content selection module 335 determines a measure of relevance of various content items to a user based on characteristics associated with the user by the venue management system 250 based on actions associated with the user by the venue management system 250, characteristics of the user maintained by the venue management system 250, preferences of the user maintained by the venue management system 250, and characteristics of content items eligible for presentation to the user. For example, the content selection module 335 determines measures of relevance to a user based on characteristics of the content items, characteristics of the user, and actions associated with the user. Based on the measures of relevance, the content selection module 335 selects one or more content items for presentation to the user (e.g., content items having at least a threshold measure of relevance, content items having highest measures of relevance relative to other content items). In some embodiments, the content selection module 335 ranks content items based on their associated measures of relevance and selects content items having the highest positions in the ranking or having at least a threshold position in the ranking for presentation to the user.

A content item may be associated with bid amounts specifying an amount of compensation received by the venue management system 250 from a third party system 130 or from a user if one or more criteria associated with the content item are satisfied. For example, a bid amount associated with a content item specifies an amount of compensation received by the venue management system 250 when the content item is presented to a user or when a user presented with the content item performs a specified type of interaction with the content item. The content selection module 335 uses the bid amounts associated with various content items when selecting content for presentation to the user. In various embodiments, the content selection module 335 determines an expected value associated with various content items based on their bid amounts and selects content items associated with a maximum expected value or associated with at least a threshold expected value for presentation to the user. An expected value associated with a content item represents an expected amount of compensation to the venue management system 250 for presenting a content item. For example, the expected value associated with a content item is a product of the content item's bid amount and a likelihood of the user interacting with the content item. The content selection module 335 may rank content items associated with bid amounts separately than content items that are not associated with bid amounts and select content items for presentation based on the separate rankings (e.g., content items having at least a threshold position in a ranking).

The web server 340 links venue management system 250 via the network 220 to one or more client devices 210, as well as to one or more third party systems 230. Additionally, the web server 340 may exchange information between the venue management system 250 and one or more vendor systems 240. The web server 340 serves web pages, as well as other content, such as JAVA®, FLASH®, XML and so forth. The web server 340 may receive and route messages between the venue management system 250 and a client device 210, for example, instant messages, queued messages (e.g., email), text messages, short message service (SMS) messages, or messages sent using any other suitable messaging technique. A user may send a request to the web server 340 to upload information (e.g., images or videos) that are stored in the content store 210. Additionally, the web server 340 may provide application programming interface (API) functionality to send data directly to native client device operating systems, such as IOS®, ANDROID™, WEBOS® or BlackberryOS.

Dynamic Modification of Venue Parking Inventory

Figure 4:
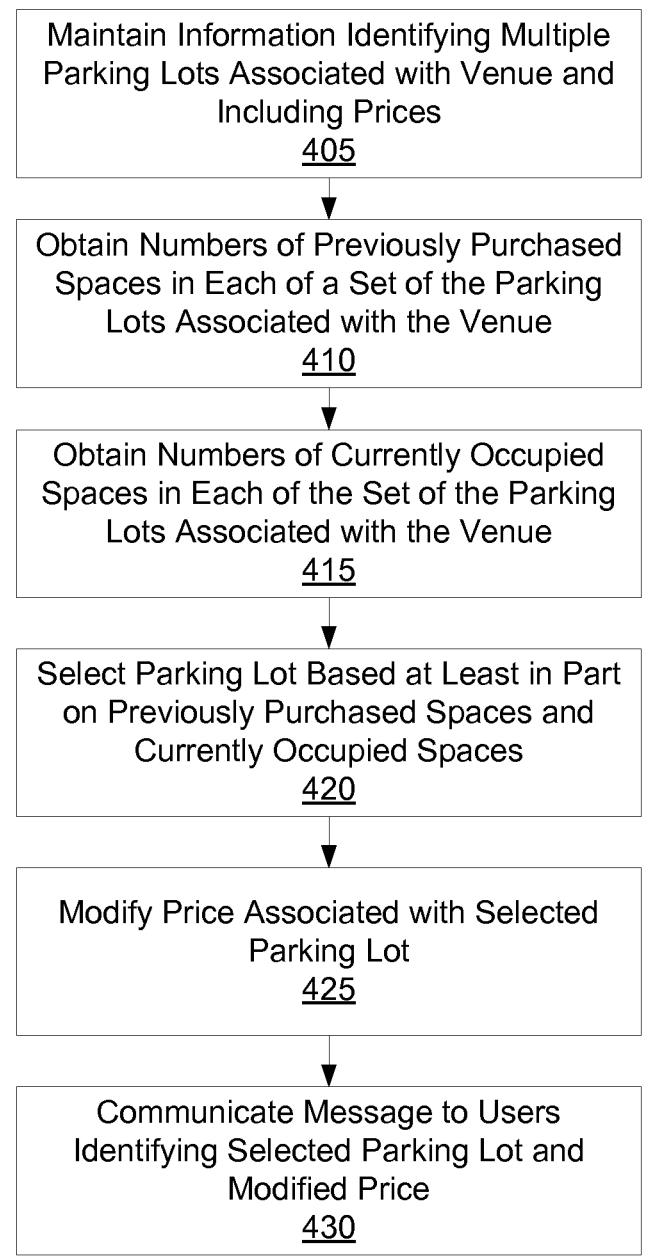
FIG. 4 is a flowchart of a method for dynamically managing use of parking lots associated with a venue, in accordance with an embodiment of the invention.

FIG. 4 is a flowchart of one embodiment of a method for dynamically managing use of parking lots 130 associated with a venue 100. In other embodiments, the method may include different and/or additional steps than those described in conjunction with FIG. 4. Additionally, in other embodiments, steps of the method may be performed in orders different than the order described in conjunction with FIG. 4.

As described above in conjunction with FIG. 3, a venue management system 250 maintains 405 information identifying multiple parking lots 130 associated with a venue 100. In various embodiments, the venue management system 250 associates a unique lot identifier with each parking lot 130. The venue management system 250 maintains 405 information describing a parking lot 130 in association with the lot identifier of the parking lot 130. In various embodiments, the venue management system 250 maintains 405 a capacity of a parking lot 130, which specifies a total number of spaces included in the parking log 130, and a price of the parking lot 130, specifying an amount of compensation for use of a space in the parking lot 130, in association with a lot identifier of the parking lot 130. Additional information associated with the parking lot 130 may be stored in various embodiments.

Information identifying a number of previously purchased spaces in at least a set of parking lots 130 associated with the venue 100 is obtained 410 by the venue management system 250. In some embodiments, the venue management system 250 obtains 410 a number of previously purchased spaces in each parking lot 130 associated with the venue 100. The venue management system 250 may receive information from a user identifying a parking lot 130 and payment information and modifies information associated with the parking lot 130 by the venue management system 250 specifying a number of spaces in the parking lot 130 that have been purchased by one or more users. Alternatively, the venue management system 250 may obtain 410 information maintained by one or more third party systems 230 that receive information from users identifying one or more parking lots 130 and information from users purchasing spaces in one or more parking lots 130. For example, a third party system 230 receives payment information and parking lot identification information from various users and allocates spaces in parking lots 130 to users based on the payment information. Information identifying a number of spaces in one or more parking lots 130 that have been purchased by users is communicated from the third party system 230 to the venue management system 250 at periodic intervals or when the third party system 230 receives a request for information from the venue management system 250.

As users park vehicles in spaces of a parking lot 130, a device or system associated with the parking lot 130 identifies a number of currently occupied spaces in the parking lot 130. In various embodiments, when a vehicle enters the parking lot 130, a device obtains information from the vehicle or from a user associated with the vehicle and increments a number of currently occupied spaces in the parking lot 130 when the information is obtained. For example, a device included in the parking lot 130 scans a barcode, a quick response (QR) code, or other information from a ticket associated with a user when the user brings a vehicle into the parking lot and increases a number of currently occupied spaces in the parking lot 130 after receiving data from the barcode, from the QR code, or from the other information. Alternatively, after parking a vehicle in a space of the parking lot 130, a user identifies a space including the vehicle to a terminal included in the parking lot 130, and the terminal increments a number of currently occupied spaces in the parking lot 130. Hence, a device or system associated with a parking lot 130 tracks a number of spaces in the parking lot 130 that are currently occupied by vehicles.

The venue management system 250 obtains 415 information identifying a number of currently occupied spaces in various parking lots 130 associated with the venue 100 from devices or systems associated with the parking lots 130. In some embodiments, the venue management system 250 obtains 415 information from each parking lot 130 associated with the venue 100. Alternatively, the venue management system 250 obtains 415 information from a set of parking lots 130 associated with the venue 100 identifying a number of currently occupied spaces in each of the set of parking lots 130. For example, the venue management system 250 communicates a request for a number of currently occupied spaces in a parking lot 130 to a device or system included in the parking lot 130 or associated with the parking lot 130. The device or system associated with the parking lot 130 or included in the parking lot 130 communicates a number of currently occupied spaces in the parking lot 130 to the venue management system 250 in response to the request. Alternatively, the device or system included in or associated with the parking lot 130 communicates a number of occupied spaces in the parking lot 130 to the venue management system 250 when the device or system increments the number of currently occupied spaces in the parking lot 130. In another embodiment, the device or system included in or associated with the parking lot 130 periodically communicates the number of currently occupied spaces in the parking lot 130 to the venue management system 250.

Based on the number of previously purchased spaces in various parking lots 130, the number of currently occupied spaces in various parking lots 130, and capacities of various parking lots 130, the venue management system 250 selects 420 a parking lot 130 associated with the venue 100. In various embodiments, the venue management system 250 selects 420 a parking lot having at least a threshold difference between the number of currently occupied spaces in the parking lot 130 and the capacity of the parking lot 130. For example, the venue management system 250 determines a difference between the number of currently occupied spaces in a parking lot 130 and a capacity of the parking lot 130 for each parking lot 130 and selects 420 a parking lot 130 having a maximum difference between its number of currently occupied spaces and its maximum capacity. Alternatively, the venue management system 250 selects 420 a parking lot 130 having a maximum difference between its currently occupied spaces and its maximum capacity. In other embodiments, the venue management system 250 selects 420 a parking lot 130 having at least a threshold difference between a number of previously purchased spaces in the parking lot 130 and a capacity of the parking lot 130 or having a maximum difference between the number of previously purchased spaces in the parking lot 130 and the capacity of the parking lot 130. Alternatively, the venue management system 250 selects 420 a parking lot 130 having at least at threshold difference between a number of previously purchased spaces in the parking lot 130 and a number of currently occupied spaces in the parking lot 130. and capacities of each parking lot 130 or selects 420 a parking lot 130 having a maximum difference between the number of previously purchased spaces in the parking lot 130 and the number of currently occupied spaces in the parking lot 130. In other embodiments, the venue management system 250 ranks various parking lots 130 based on one or more of the above-described differences and selects 420 a parking lot having a maximum position in the ranking or selects 420 one or more parking lots having at least a threshold position in the ranking.

As another example, the venue management system 250 determines a number of available spaces in various parking lots 130 associated with the venue 100 and also determines a difference between the number of available spaces in a parking lot 130 and the capacity of the parking lot 130 for various parking lots 130. The number of available spaces in a parking lot 130 is a difference between a capacity of the parking lot 130 and the number of previously purchased spaces in the parking lot 130. In some embodiments, the venue management system 250 determines differences between numbers of available spaces and capacities for each parking lot 130 associated with the venue 100. Based on the differences between numbers of available spaces and capacities for various parking lots 130, the venue management system 250 selects 420 a parking lot 130. For example, the venue management system 250 selects 420 one or more parking lot 130 having at least a threshold difference between their capacity and their number of previously purchased spaces or selects 420 a parking lot 130 having a maximum difference between its capacity and its number of previously purchased spaces. As another example, the venue management system 250 ranks various parking lots 130 based on their differences between their capacities and their numbers of previously purchased spaces and selects 420 one or more parking lots 130 having at least a threshold position in the ranking. In other embodiments, the venue management system 250 selects 420 one or more parking lots 130 based on ratios of the number of available spaces in a parking lot 130 to the capacity of the parking lot 130. For example, one or more parking lots 130 having at least a threshold ratio of available spaces to capacities are selected 420. As another example, the vendor management system 250 ranks parking lots 130 based on their ratios of available spaces to capacities (e.g., higher ratios have higher positions in the ranking) and selects one or more parking lots 130 having at least a threshold position in the ranking. Alternatively, the venue management system 250 selects 420 one or more parking lots 130 based on a difference between a number of currently occupied spaces and a number of previously purchased spaces associated with various parking lots 130 or based on a ratio of a number of currently occupied spaces to previously purchased spaces for various parking lots 130 (e.g., a parking lot 130 having at least a threshold difference between currently occupied spaces and previously purchased spaces, a parking lot 130 having at least a threshold ratio of currently occupied spaces to previously purchased spaces).

In various embodiments, the venue management system 250 modifies 425 the price associated with the selected parking lot 130. For example, the venue management system 250 decreases the price associated with the selected parking lot 130. In some embodiments, the amount by which the price associated with the selected parking lot 130 is decreased is based at least in part on a difference between a current time and a time associated with an event occurring at the venue 100. For example, the price associated with the selected parking lot 130 is decreased by a larger amount when there is a smaller difference between a current time and the time associated with the event occurring at the venue 100. As another example, the price associated with the selected parking lot 130 is modified 425 by an amount proportional to a difference between a number of currently occupied spaces in the selected parking lot 130 and a number of previously purchased spaces in the selected parking lot 130, proportional to a difference between a number of previously purchased spaces in the selected parking lot 130 and a capacity of the selected parking lot 130, or proportional to any suitable value. For example, a price associated with a selected parking lot 130 is decreased by a larger amount when there is a larger difference between a number of previously purchased spaces in the selected parking lot 130 and a capacity of the selected parking lot 130.

The venue management system 250 communicates 430 a message to client devices 210 associated with one or more users identifying the selected parking lot 130. In various embodiments, the message also identifies the modified price associated with the selected parking lot 130. Additionally, the message identifies a difference between a number of previously purchased spaces in the selected parking lot 130 and a capacity of the selected parking lot 130 to identify a number of available spaces in the selected parking lot 130 in various embodiments. The message may also identify a number of currently occupied spaces in the selected parking lot 130 in some embodiments.

Characteristics associated with a user may be used by the venue management system 250 to determine whether to communicate 430 the message to a client device 210 associated with the user. For example, the venue management system 250 identifies users having a specific status included in their user profiles and communicate 430 the message to client devices 210 associated with users having the specific status included in their user profiles. An alternative message or no message may be communicated to users that do not have the specific status included in their user profile. As another example, the venue management system 250 determines locations of client devices 210 associated with various users of the venue management system 250 and determines distances between the locations of the client devices 210 and the location of the selected parking lot 130. The venue management system 250 communicate 430 the message to client devices 210 having locations within a threshold distance of the location of the selected parking lot 130. Locations of client devices 210 relative to other parking lots 130 associated with the venue 100 may also be used when communicating 425 the message to a client device 210. In one embodiment, the venue management system 250 determines distances between locations of client devices 210 and a location of an additional parking lot 130 associated with a price lower than the modified price of the selected parking lot 130. The venue management system 250 communicate 430 the message to client devices 210 associated with locations that are at least a threshold distance from the location of the additional parking lot 130. This allows the venue management system 250 to notify users of the selected parking lot 130 before the users reach the additional parking lot 130, which may encourage users to park in the selected parking lot 130 and increase revenue to the venue management system 250 by paying the modified price associated with the selected parking lot 130 rather than the lower price associated with the additional parking lot 130.

Various communication channels may be used by the venue management system 250 to communicate 430 the message to client devices 210 associated with users of the venue management system 250. In various embodiments, the message is communicated 425 to client devices 210 via a text message, an e-mail message, a notification presented via an application associated with the venue management system 250 executing on a client device 210, or any other suitable communication channel. Different communication channels may be used to communicate 430 the message to client devices 210 associated with different users. One or more settings included in a user profile associated with a user may specify communication preferences for the user, such as a type of communication channel for communicating 425 the message identifying the selected parking lot 130 to the user. For example, based on user profile information associated with a user, the venue management system 250 communicate 430 the message to a client device 210 associated the user via a text message, while based on user profile information associated with another user, the venue management system 250 communicates the message to a client device 210 associated with the other user via a notification presented by an application associated with the venue management system 250 executing on the client device 210.

Providing Navigation Directions to Parking Lots Associated with a Venue

Figure 5:
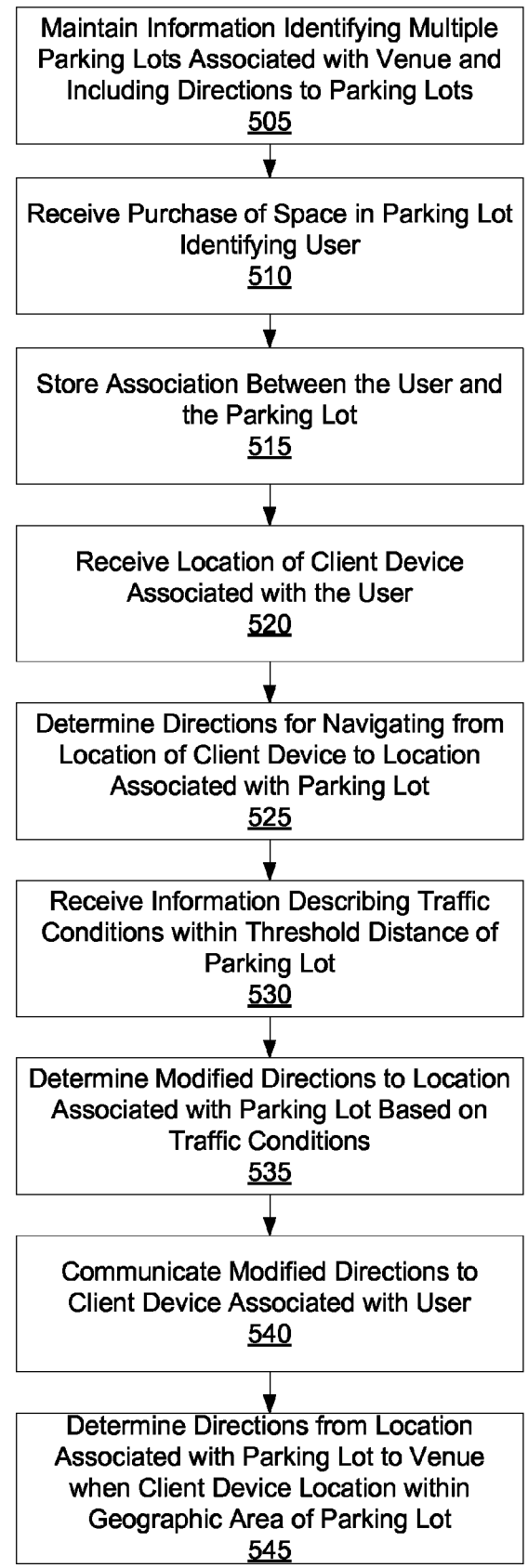
FIG. 5 is a flowchart of a method for communicating directions to a parking lot associated with a venue to one or more users of a venue management system, in accordance with an embodiment of the invention.

FIG. 5 is a flowchart of one embodiment of a method for communicating directions to a parking lot 130 associated with a venue 100 to one or more users of a venue management system 250. In other embodiments, the method may include different and/or additional steps than those described in conjunction with FIG. 5. Additionally, in other embodiments, steps of the method may be performed in orders different than the order described in conjunction with FIG. 5.

As described above in conjunction with FIG. 3, the venue management system 250 maintains 505 information identifying multiple parking lots 130 associated with a venue 100. Information associated with a parking lot 130 includes directions to one or more locations associated with the parking lot 130. Directions to the parking lot 130 may be text directions describing navigation to a location associated with the parking lot 130 (e.g., one or more entrances to the parking lot 130) from various positions relative to the location associated with the parking lot 130 or image data (e.g., a map) identifying the parking lot 130 and identifying directions to the location associated with the parking lot 130 from one or more positions relative to the location associated with the parking lot 130. For example, directions to the location parking lot 130 identify directions to a location associated with the parking lot 130 from north, south, east, or west of the location associated with the parking lot 130. Directions to the one or more locations associated with the parking lot 130 are stored by the venue management system 250 in association with a lot identifier corresponding to the parking lot 130.

When a user purchases a space in the parking lot 130, the venue management system 250 receives 510 a description of the purchase identifying the user and identifying the parking lot 130. For example, the user purchases the space in the parking lot 130 via the venue management system 250 by identifying the parking lot 130 and providing a user identifier (e.g., an e-mail address, a username, or other information identifying the user) to the venue management system 250. The user may provide payment information to the venue management system 250 when purchasing the space in the parking lot 130 as well. Alternatively, the user selects the parking lot 130 and provides information identifying the user to a third party system 130, which communicates a lot identifier associated with the parking lot 130 and information identifying the user to the venue management system 250; if the user selects the parking lot 130 via a third party system 130, the user may provide payment information for the space in the parking lot 130 to the third party system 130 rather than to the venue management system 250. In other embodiments, the venue management system 250 maintains information associating the user with a parking lot 130, such as a parking lot 130 associated with a ticket to the venue 100 previously purchased by the user (e.g., a parking lot 130 associated with users who have pre-purchased tickets to multiple events at the venue 100). Hence, the venue management system 250 receives a request including user identifying information and a lot identifier and stores 515 an association between the user and the parking lot 130 based on the user identifying information and the lot identifier. For example, the venue management system 250 stores 515 a pair including user identifying information and the lot identifier.

After storing 515 the association between the user and the parking lot 130, the venue management system 250 subsequently receives 520 a location of a client device 210 associated with the user. For example, the user communicates a request for directions to the parking lot 130 from the client device 130 that includes a location of the client device 210. Alternatively, the client device 210 communicates its location to the venue management system 250 at periodic intervals or the client device 210 communicates its location to the venue management system 250 in response to a request from the venue management system 250 received by the client device 210. In some embodiments, the client device 210 communicates its location to the venue management system 210 when the client device 210 determines it is within a threshold distance of the venue or within a threshold distance of a location associated with the parking lot 130.

Based on the location of the client device 210 associated with the user, the venue management system 250 determines 525 directions for navigating from the location of the client device 210 to a location associated with the parking lot 130 associated with the user. In one embodiment, the client device 210 determines a position of the location of the client device 210 relative to a location associated with the parking lot 130 and retrieves directions to the location associated with the parking lot 130 from the relative position of the location of the client device 210 to the location associated with the parking lot 130. For example, if the venue management system 250 determines the location of the client device 210 is west of the location of the parking lot 130, the venue management system 250 retrieves directions to the location of the parking lot 130 from west of the location of the parking lot 130 associated with the parking lot 130 by the venue management system 250.

In some embodiments, the venue management system 250 also receives 530 information describing traffic conditions within a threshold distance of one or more locations associated with the parking lot 130. The information describing traffic conditions may be received from client devices 210 associated with various users of the venue management system 250 or from one or more third party systems 230. Additionally, the information describing traffic conditions identifies a number of spaces in one or more additional parking lots 130 associated with the venue 100 that are currently occupied received from one or more systems associated with the additional parking lots 130. In some embodiments, the information describing the traffic conditions includes a number of spaces currently occupied in the parking lot 130 as well as numbers of spaces currently occupied in additional parking lots 130 within a threshold distance of the parking lot 130. Based on the traffic conditions within the threshold distance of the parking lot 130, the venue management system 250 determines 535 modified directions to the location associated with the parking lot 130. In some embodiments, if one or more parking lots 130 within the threshold distance of the parking lot have ratios of their currently occupied spaces to their capacities equaling or exceeding a threshold value, the venue management system 250 determines 535 modified directions to the location associated with the parking lot 130 that direct the user away from the parking lots with ratios equaling or exceeding the threshold value. As another example, if one or more parking lots 130 within the threshold distance of the parking lot have ratios of their previously purchased spaces to their capacities equaling or exceeding a threshold value, the venue management system 250 determines 535 modified directions to the location associated with the parking lot 130 the direct the user away from the parking lots with the ratios equaling or exceeding the threshold value. Alternatively, the venue management system 250 determines 535 modified directions the location associated with the parking lot 130 that direct the user away from one or more additional parking lots 130 having at least a threshold number of currently occupied spaces; the threshold number of currently occupied spaces may be-modified by the venue management system 250 based on one or more criteria (e.g., difference between a current time and a time of an event associated with the venue 100, number of spaces in various additional parking lots 130 that have been previously purchased, etc.)

Hence, the venue management system 250 determines 535 modified direction to the location associated with the parking lot 130 that bypass congestion identified by the traffic conditions. For example, the venue management system 250 obtains information from one or more client devices 210 or from a third party system 130 identifying geographic areas having at least a threshold number of vehicles or at least a threshold density of vehicles in the geographic areas and determines 535 modified directions to the location associated with the parking lot 130 that avoid the identified geographic areas. As another example, the venue management system 250 obtains information from one or more client devices 210 or from a third party system 130 identifying a rate at which vehicles change position over various time intervals along one or more paths and determines 535 modified directions to the location associated with the parking lot 130 based at least in part on the rates at which vehicles change position along various paths (e.g., determines modified direction to the location as a path having at least a threshold rate at which vehicles change position or having a maximum rate at which vehicles change position). In some embodiments, the modified directions augment the directions associated with additional directions to avoid congestion. Alternatively, the modified directions may be alternative directions based on the location of the client device 210, the traffic conditions, and one or more locations associated with the parking lot 130. For example, the modified directions are alternative directions to a location associated with the parking lot based on the traffic conditions and a position of the client device 130 relative to a location of the parking lot 130.

The venue management system 250 communicates 540 the modified directions to the client device 210 for presentation to the user. If the venue management system 250 receives additional information describing traffic conditions after communicating 540 the modified directions to the client device 210, the venue management system 250 determines alternative directions from the location of the client device 210 to the location of the parking lot and communicates the alternative directions to the client device 210 for presentation. This allows the venue management system 250 to update the user with directions to a location associated with the parking lot 130 that allow the user reduce or avoid delays in reaching the location associated with the parking lot 130 as traffic conditions change. Similarly, alternative directions may be communicated to the client device 210 by the venue management system 250 if the location of the client device 210 changes. For example, if a position of the client device 210 relative to a location associated with the client device 210 changes, the venue management system 250 communicates 545 alternative directions to the client device 210 for presentation.

In some embodiments, when the venue management system 250 determines a current location of the client device 210 is within a geographic area associated with the parking lot 130, the venue management system 250 determines 545 directions from a location associated with parking lot 130 to the venue 100. The directions from the location associated with the parking lot 130 to the venue 100 may be similar to directions to the one or more locations associated with the parking lot 130. In various embodiments, the directions are text or image data providing directions to the venue 100 from various orientations relative to the venue 100 (e.g., north, south, east, west). For example, the venue management system 250 receives a location of the client device 210 at a periodic interval and compares the location of the client device 210 to various locations, or to a geographic area, associated with the parking lot 130. If the location of the client device 210 matches a location associated with the parking lot 130 or is within a geographic area associated with the parking lot 130, the venue management system 250 determines 545 directions from a location associated with parking lot 130 to the venue 100. Alternatively, the user communicates a request for directions to the venue 100 that includes the location of the client device 210 to the venue management system 250. In some embodiments, the venue management system 250 determines a location associated with a parking lot 130 having a minimum distance (or having a threshold distance) to a location of the client device 210 associated with the user from the request and determines 545 directions from the location associated with the parking lot 130 having the minimum distance (or having the threshold distance) to the venue 100.

When determining directions from the location associated with the parking lot 130 to the venue 100, the venue management system 250 may account for locations of additional client devices 210 associated with additional users. For example, the venue management system 250 determines densities of client devices 210 within various geographic areas between the parking lot 130 and the venue 100 and determines 545 directions from the location associated with the parking lot 130 based at least in part on densities of client devices 210 in the various geographic areas. For example, the venue management system 250 determines 545 directions from the location associated with the parking lot 130 to the venue 100 that direct a user away from geographic regions between the venue 100 and the location associated with the parking lot 130 having greater than a threshold density of client devices 110 in the geographic regions. In some embodiments, the venue management system 250 determines rates of change in location for various client devices 210 during various time intervals and determines 545 directions from the location associated with the parking lot 130 to the venue 100 based at least in part on the rates of change in locations for various client devices 210. For example, the venue management system 250 determines 545 directions from the location associated with the parking lot 130 to the venue 100 that direct the user along one or more paths where the rates of change in location for various client devices 210 equals or exceeds a threshold value. As movement of client devices 210 or density of client devices 210 in geographic regions between the location associated with the parking lot 130 changes over time, the venue management system 250 may modify the directions to the venue 100 from the location associated with the parking lot and communicate the modified direction to the client device 210 for presentation. Hence, the venue management system 250 may provide direction for a user to walk or otherwise travel from a location associated with the parking lot 130 to the venue 100 that account for movement of other users in geographic areas between the location of the parking lot 130 and the venue 100 to allow the user to avoid congestion and more quickly reach the venue from the location of the parking lot 130.

Figure 6:
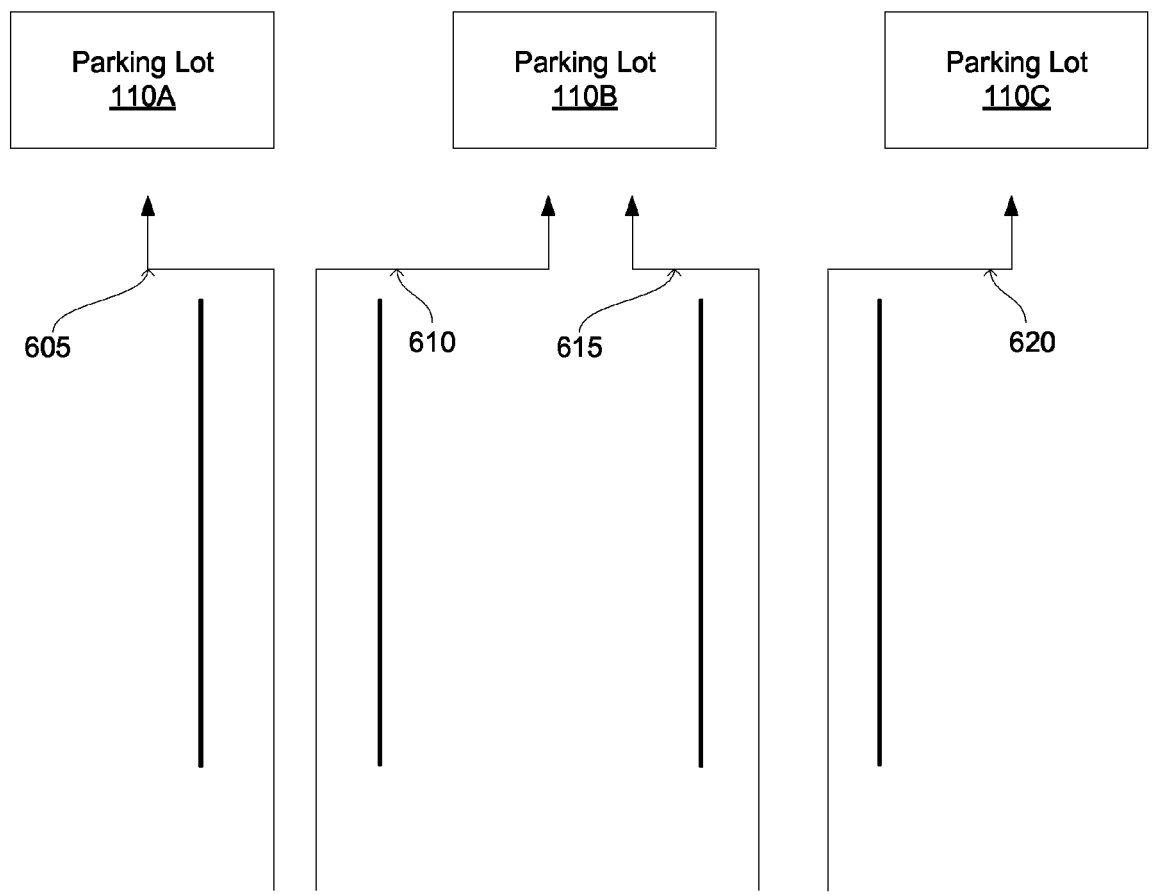
FIG. 6 is a conceptual diagram showing an example of modifying directions to a parking lot communicated to a user based on traffic conditions, in accordance with an embodiment of the invention.

FIG. 6 is a conceptual diagram showing an example of modifying directions to a parking lot 130 associated with a venue 100 based on traffic conditions. In the example of FIG. 6, parking lots 130A, 130B, 130C (also referred to individually and collectively using reference number 130) are each associated with the venue 100. A venue management system 250 associated with the venue 100 includes information identifying parking lot 130A, parking lot 130B, and parking lot 130C, with the information included in the venue management system including directions to a location associated with each of parking lot 130A, parking lot 130B, and parking lot 130C. For purposes of illustration, FIG. 6 shows an example where directions 605 describe navigation to a location associated with parking lot 130A, directions 610 and directions 615 describe navigation to a location associated with parking lot 130B, and directions 620 describe navigation to a location associated with parking lot 130C.

When determining directions to a location associated with a parking lot 130 for communication to a user, the venue management system 250 accounts for traffic conditions within a threshold distance of the parking lot 130. The traffic conditions account for a number of vehicles currently occupying additional parking lots 130 associated with the venue, such as additional parking lots 130 within a threshold distance of a parking lot 130 associated with a user. Referring to FIG. 6, if a user is associated with parking lot 130B, the venue management system 250 determines a number of currently occupied spaces associated with each of parking lot 130A and parking lot 130C, as parking lot 130A and parking lot 130C are within a threshold distance of parking lot 130B. If parking lot 130A has at least a threshold number of currently occupied spaces and parking lot 130C has less than the threshold number of currently occupied spaces, the vendor management system 250 determines there is a high likelihood of congestion if travelling along directions 610 to the location associated with parking lot 130B because of the proximity of directions 605 to directions 610 and the likelihood of more than a threshold number of vehicles travelling along directions 605. Accordingly, in the preceding example, the venue management system 250 communicates directions 615 to a client device 210 associated with a user to direct the user to the location associated with parking lot 130B using directions where the user is less likely to encounter delays from congestion by vehicles traveling to an additional parking lot 130.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining, at a venue management system, information identifying a parking lot associated with a venue and directions to one or more locations associated with the parking lot;
   maintaining an association between a user of a venue management system and the parking lot;
   receiving a location of a client device associated with the user;
   determining directions to a location associated with the parking lot based at least in part on the location of the client device;
   receiving information describing traffic conditions within a threshold distance of the parking lot, the traffic conditions identifying a number of spaces currently occupied in one or more additional parking lots associated with the venue;
   determining modified directions to the location associated with the parking lot based at least in part on the information describing the traffic conditions within the threshold distance of the parking lot and the location of the client device;
   communicating the modified directions to the location associated with the parking lot to the client device associated with the user;
   determining a current location of the client device is within a geographic area associated with the parking lot;
   in response to determining the current location of the client device being within the geographic area associated with the parking lot, determining directions from the location associated with the parking lot to the venue;
   communicating the directions from the location associated with the parking lot to the venue to the client device for presentation to the user;
   determining locations of additional client devices associated with additional users;
   determining information describing locations of the additional client devices in one or more geographic areas that are between the venue and the location associated with the parking lot; and
   determining the directions from the location associated with the parking lot to the venue based at least in part on the information describing locations of the additional client devices in the one or more geographic areas that are between the venue and the location associated with the parking lot.

2. The method of claim 1, wherein determining the directions from the location associated with the parking lot to the venue based at least in part on the information describing locations of the additional client devices in the one or more geographic areas that are between the venue and the location associated with the parking lot comprises:
   determining a density of additional client devices included in at least a set of the one or more geographic areas based on the locations of the additional client devices; and
   determining directions from the location associated with the parking lot to the venue that direct the user away from one or more of the geographic areas having greater than a threshold density of additional client devices.

3. The method of claim 1, wherein determining the directions from the location associated with the parking lot to the venue based at least in part on the information describing locations of the additional client devices in the one or more geographic areas that are between the venue and the location associated with the parking lot comprises:
   determining rates of change of locations of the additional client devices along one or more paths between the location associated with the parking lot and the venue based on changes in locations of the additional client devices over time from the information describing the locations of the additional client devices; and
   determining directions from the location associated with the parking lot to the venue that identify a path having at least a threshold rate of change of location of the additional client devices.

4. The method of claim 1, wherein determining modified directions to the location associated with the parking lot based at least in part on the information describing the traffic conditions within the threshold distance of the parking lot and the location of the client device comprises:
   determining a density of vehicles included in one or more geographic areas between the location of the client device and the location associated with the parking lot based at least in part on the information describing the traffic conditions within the threshold distance of the parking lot and the location of the client device; and
   determining the modified directions to the location associated with the parking lot as directions that direct the user away from one or more of the geographic areas having greater than a threshold density of vehicles.

5. The method of claim 1, wherein determining modified directions to the location associated with the parking lot based at least in part on the information describing the traffic conditions within the threshold distance of the parking lot and the location of the client device comprises:
   determining rates of change of locations of vehicles along one or more paths between the location of the client device and the location associated with the parking lot based on based on changes in locations of the vehicles from the information describing the traffic conditions;
   determining the modified directions to the location associated with the parking lot as directions that identify a path having at least a threshold rate of change of location of the vehicles.

6. The method of claim 1, wherein the information describing the traffic conditions identifies a number of spaces currently occupied in one or more additional parking lots within a threshold distance of the parking lot.

7. The method of claim 6, wherein determining modified directions to the location associated with the parking lot based at least in part on the information describing the traffic conditions within the threshold distance of the parking lot and the location of the client device comprises:
   determining the modified directions as directions that direct the user away from an additional parking lot having at least a threshold ratio of currently occupied spaces to capacity of the additional parking lot.

8. A method comprising:
   maintaining, at a venue management system, information identifying a parking lot including a plurality of spaces associated with a venue and directions to one or more locations associated with the parking lot;
   maintaining an association between a user of the venue management system and the parking lot;
   receiving a location of a client device associated with the user;
   receiving information describing traffic conditions within a threshold distance of the parking lot;
   determining directions to the location associated with the parking lot based at least in part on the information describing the traffic conditions within the threshold distance of the parking lot and the location of the client device;
   communicating the directions to the location associated with the parking lot to the client device associated with the user;
   determining a current location of the client device is within a geographic area associated with the parking lot
   in response to determining the current location of the client device being within the geographic area associated with the parking lot, determining modified directions from the location associated with the parking lot to the venue;
   communicating the modified directions from the location associated with the parking lot to the venue to the client device for presentation to the user;
   determining locations of additional client devices associated with additional users;
   determining information describing locations of the additional client devices in one or more geographic areas that are between the venue and the location associated with the parking lot; and
   determining the modified directions from the location associated with the parking lot to the venue based at least in part on the information describing locations of the additional client devices in the one or more geographic areas that are between the venue and the location associated with the parking lot.

9. The method of claim 8, wherein the information describing the traffic conditions identifies a number of spaces currently occupied in one or more additional parking lots within a threshold distance of the parking lot.

10. The method of claim 9, wherein determining the directions to the location associated with the parking lot based at least in part on the information describing the traffic conditions within the threshold distance of the parking lot and the location of the client device comprises:
    determining the modified directions as directions that direct the user away from an additional parking lot having at least a threshold ratio of currently occupied spaces to capacity of the additional parking lot.

11. The method of claim 9, wherein determining the directions to the location associated with the parking lot based at least in part on the information describing the traffic conditions within the threshold distance of the parking lot and the location of the client device comprises:
    determining the modified directions as directions that direct the user away from an additional parking lot having at least a threshold number of currently occupied spaces.

12. The method of claim 8, wherein the information describing the traffic conditions includes a number of currently occupied spaces in the parking lot.

13. The method of claim 8, wherein determining directions from the location associated with the parking lot to the venue comprises:
    determining locations of additional client devices associated with additional users;
    determining information describing locations of the additional client devices in one or more geographic areas that are between the venue and the location associated with the parking lot; and
    determining the directions from the location associated with the parking lot to the venue based at least in part on the information describing locations of the additional client devices in the one or more geographic areas that are between the venue and the location associated with the parking lot.

14. The method of claim 8, wherein determining the directions from the location associated with the parking lot to the venue based at least in part on the information describing locations of the additional client devices in the one or more geographic areas that are between the venue and the location associated with the parking lot comprises:
    determining a density of additional client devices included in at least a set of the one or more geographic areas based on the locations of the additional client devices; and
    determining directions from the location associated with the parking lot to the venue that direct the user away from one or more of the geographic areas having greater than a threshold density of additional client devices.

15. A computer program product comprising a computer readable storage medium that having instructions encoded thereon that, when executed by a processor, cause the processor to:
    maintain, at a venue management system, information identifying a parking lot associated with a venue and directions to one or more locations associated with the parking lot;
    maintain an association between a user of the venue management system and the parking lot;
    receive a location of a client device associated with the user;
    determine directions to a location associated with the parking lot based at least in part on the location of the client device;
    receive information describing traffic conditions within a threshold distance of the parking lot, the traffic conditions identifying a number of spaces currently occupied in one or more additional parking lots associated with the venue;
    determine modified directions to the location associated with the parking lot based at least in part on the information describing the traffic conditions within the threshold distance of the parking lot and the location of the client device;

communicate the modified directions to the location associated with the parking lot to the client device associated with the user;
determine a current location of the client device is within a geographic area associated with the parking lot;
in response to determining the current location of the client device being within the geographic area associated with the parking lot, determine directions from the location associated with the parking lot to the venue;
communicate the directions from the location associated with the parking lot to the venue to the client device for presentation to the user;
determine locations of additional client devices associated with additional users;
determine information describing locations of the additional client devices in one or more geographic areas that are between the venue and the location associated with the parking lot; and
determine the directions from the location associated with the parking lot to the venue based at least in part on the information describing locations of the additional client devices in the one or more geographic areas that are between the venue and the location associated with the parking lot.

16. The computer program product of claim 15, wherein determine modified directions to the location associated with the parking lot based at least in part on the information describing the traffic conditions within the threshold distance of the parking lot and the location of the client device comprises:
determine the modified directions as directions that direct the user away from an additional parking lot having at least a threshold ratio of currently occupied spaces to capacity of the additional parking lot.

* * * * *